United States Patent [11] 3,544,758

[72] Inventor Guido A. dal Molin,
 Westlake, Ohio
[21] Appl. No. 672,794
[22] Filed Oct. 4, 1967
[45] Patented Dec. 1, 1970
[73] Assignee Unitec
 a corporation of Ohio

[54] CABLE APPARATUS FOR CONDUCTING GAS AND ELECTRICAL CURRENT
 6 Claims, 19 Drawing Figs.
[52] U.S. Cl. ................................................. 219/130,
 219/74
[51] Int. Cl. ................................................. B23k 9/16
[50] Field of Search ..................................... 219/130,
 136, 74, 75; 339/Inquired

[56] References Cited
 UNITED STATES PATENTS

| | | | |
|---|---|---|---|
| 2,666,832 | 1/1954 | Landis et al. | 219/130 |
| 2,952,766 | 9/1960 | Craig et al. | 219/130 |
| 3,155,811 | 11/1964 | Adamson et al. | 219/130 |
| 3,239,647 | 3/1966 | Irniger | 219/130 |
| 3,265,856 | 8/1966 | Cecil | 219/130 |
| 3,436,522 | 4/1969 | Carkhuff et al. | 219/130 |

Primary Examiner—J. V. Truhe
Assistant Examiner—J. G. Smith
Attorney—Bosworth, Sessions, Herrstrom and Cain ABSTRACT: Cable apparatus for conducting gas and electricity, and if desired, electrode wire, having at least one end of the cable means for making a quickly disconnectible connection to connectible means such as a gun or the like that emits electric current, gas, and electrode wire if desired.

PATENTED DEC 1 1970
3,544,758
SHEET 1 OF 3
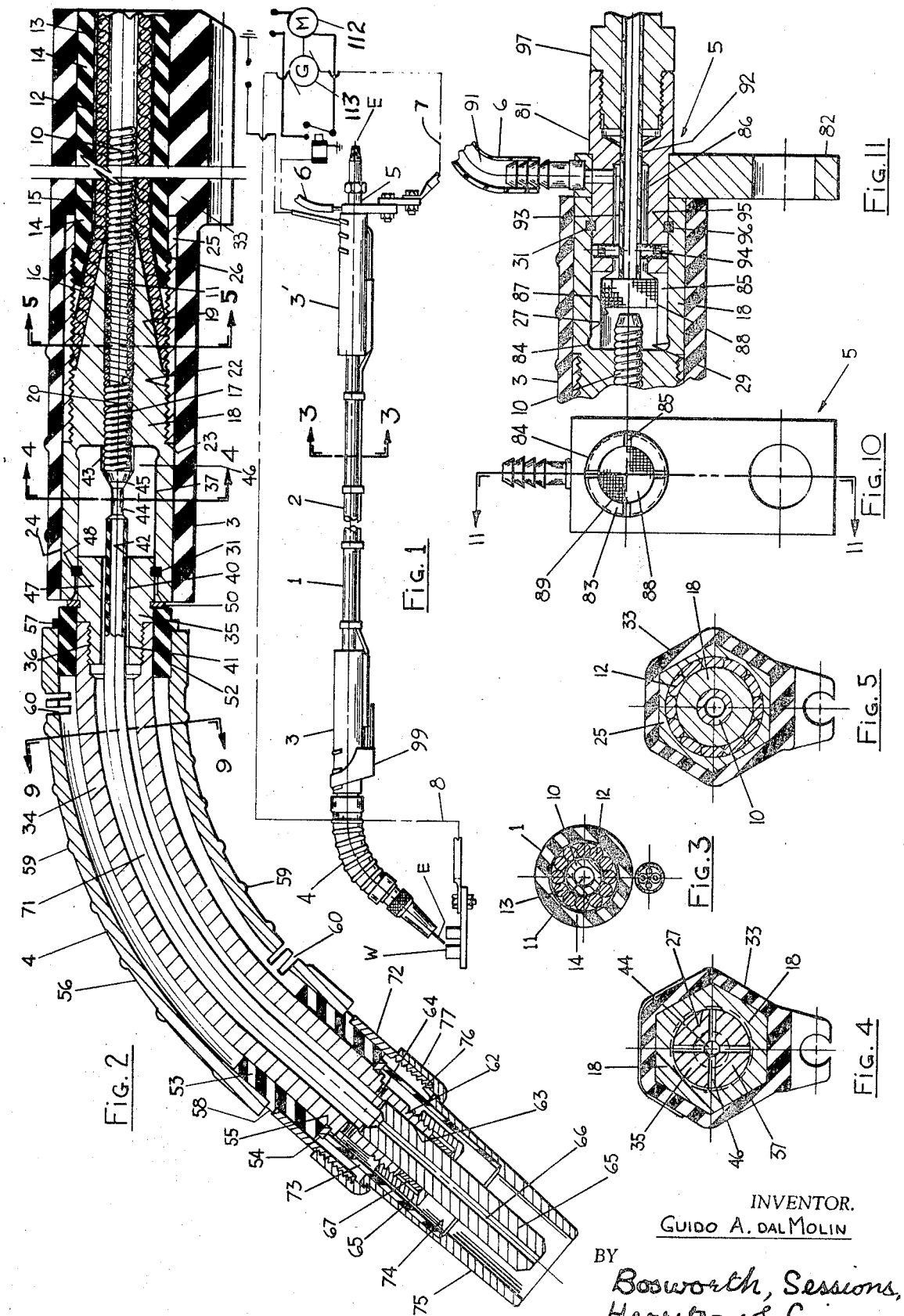
INVENTOR.
GUIDO A. DAL MOLIN
BY Bosworth, Sessions,
Herrstrom & Cain
ATTORNEYS

PATENTED DEC 1 1970 3,544,758

INVENTOR.
GUIDO A. DAL MOLIN
BY Bosworth, Sessions,
Herrstrom & Cain
ATTORNEYS

CABLE APPARATUS FOR CONDUCTING GAS AND ELECTRICAL CURRENT

BACKGROUND OF THE INVENTION

This invention relates to cable apparatus for conducting gas and electricity, and electrode wire if desired, and more particularly to such apparatus comprising a flexible cable adapted to be readily and quickly connected to and disconnected from connectable means such as a gun for emitting gas, electricity and welding wire if desired, or such as means for feeding into the cable gas, electrical current, and welding wire if desired.

For convenience, the invention will be described with reference to gas-shielded consumable electric arc welding, in which use it provides particular advantages, although it may be advantageously used in cutting apparatus as well as other types of apparatus embodying flexible cables for conducting electricity and gas.

In such welding, there is fed into a welding zone in which the welding occurs a consumable wire electrode that is connected to one side of an electrical welding circuit the other side of which is connected to the work to be welded. It is common practice in such welding to surround the welding zone with a shielding gas to prevent extraction from the ambient air of contaminants such as oxygen or nitrogen that can have a deleterious effect on the metal being welded. The shielding gas may be an inert gas such as helium or argon, and preferably is continuously supplied to form a shield or curtain around the tip of the electrode in the welding zone.

Apparatus heretofore widely used for such welding has embodied a cable through which the wire electrode passes and which conducts the electric current from the current supply to the welding zone. However, in such apparatus the shielding gas has usually been supplied by a separate hose, usually clipped to such cable and connected at one end to a source of gas and the other end to the welding gun. This hose, being separate from the cable, often tends to become entangled with objects in the vicinity of the welding zone and also is often in the way of the operator and impairs his welding efficiency.

Such widely used welding cable also usually has a portion at one end to which the welding head or gun is attached, and a different-type portion at the other end to which is attached guide or other means for feeding the electrode wire into the cable. Moreover, the end of the cable near the welding head usually tends to wear most since it is handled by the operator and is often dragged over the floor or other supporting means in service. Consequently, when the cable becomes excessively worn at one end, the usual practice is to cut off the worn end of the cable and reattach the severed connecter portion to the new unworn end. This is a laborious and time consuming process and inevitably eventually results in a cable that is undesirably short. Furthermore, in such prior apparatus, the welding gun is usually connected to the end of the cable by cumbersome means that requires considerable time to effect a gun change as is often necessary in welding activities. Furthermore, in such prior cable apparatus there is no provision for permitting rotation of the gun relative to the cable, so welding efficiency is reduced because of difficulties in manipulation the gun that is nonrotatably attached to the relatively stiff cable.

Cable constructions have been proposed to overcome some of such difficulties. However, in general such apparatus does not permit rotation of the gun relative to the cable, and lacks other desired features, or is quite complicated in construction or cannot be disconnected or reconnected to convertible means with as great ease as is often desirable.

SUMMARY OF THE INVENTION

It is an object of the present invention to provide cable apparatus that eliminates as many of the above disadvantages as is desired. Another object is the provision of such apparatus in which shielding gas, electrical current and, if desired, welding electrode wire are all passed through the same cable. A further object is the provision of a cable having connecter means making it possible quickly and easily to connect and disconnect a gun or other connectable means such as a feeder to or from the cable, while providing an electrically conductive and gastight joint between the cable and connectable means. Another object is the provision of such apparatus in which the gun or other connectable means can be rotated relative to the cable. Another object is the provision of such apparatus in which the welding cable has identical connecter portions at both ends so that both ends of the cable can be disconnected from the welding gun and from the feeder and the ends of the cable can be interchanged to equalize wear. A further object of the invention is to provide improved gun apparatus. Another object is to provide improved feeder means. Another object is the provision of such apparatus which is durable and can be manufactured at a reasonable cost.

BRIEF DESCRIPTION OF THE DRAWINGS

These and other objects, and features of the invention will become apparent from the following description of the preferred embodiment in connection with the accompanying drawings in which:

FIG. 1 is an exterior view to a small scale of apparatus embodying the invention, showing a welding cable having identical connecter portions at both ends, one connecter portion being connected to a welding gun and the other connecter portion being connected to a feeder for feeding electrode wire and shielding gas into the cable; the apparatus also includes schematically depicted electrode circuit means;

FIG. 2 is a sectional elevation to an enlarged scale, of one end of the cable, showing the construction of one of the identical connecter portions, and also the internal construction of a welding gun connected to such connecter portion;

FIG. 3 is a section through the cable along line 3–3 of FIG. 1, but to the same scale as FIG. 2;

FIG. 4 is a section along line 4–4 of FIG. 2 and to the same scale;

FIG. 5 is a section along line 5–5 of FIG. 2 and to the same scale;

FIG. 10 is an exterior end elevation of a feeder embodying the invention, to the same scale as FIGS. 2 and 6;

FIG. 11 is a section of the feeder along line 11–11 of FIG. 10 and to the same scale, the feeder in this FIG., however, being shown as connected to the end of the cable;

FIGS. 14, 15.

DESCRIPTION OF PREFERRED EMBODIMENTS

Figure 6:
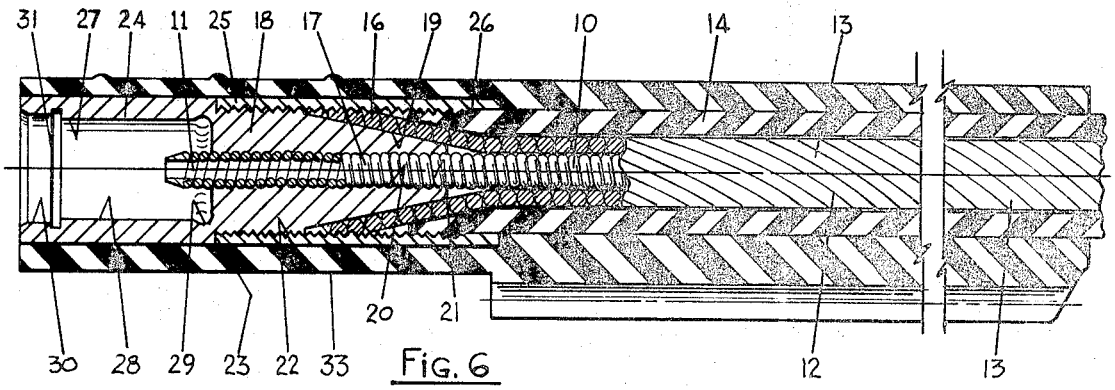
FIG. 6 is a section to the same scale as FIG. 2 through a connecter portion of the cable that is unconnected to any connectable means.

The apparatus shown in FIG. 1 comprises a cable 1 having a central portion 2, identical connecter portions 3 and 3', a welding gun 4 connected to one of the portions 3, and feeder 5 connected to the other portion 3'. Electrode wire E is fed through the cable by feeder 5 and exits through the gun 4. Gas is supplied by hose 6 to feeder 5 and is discharged through the gun 4. Feeder 5 is connected by wire 7 to one side of electrical energy supply circuit, discussed later, while the work W is connected by wire 8 to the other side of the circuit.

As shown in FIGS. 2, 3, 4 and 5, the cable comprises a hollow flexible nonmagnetic liner 10 having a passage 11 through which the electrode wire E passes; in this embodiment the liner 10 is formed of helically wound stainless steel wire. This liner is covered by a flexible sheath 12 of one or more layers of electrically conductive material, such as copper strand 13 that acts as the electrical conductor; in this embodiment each layer of sheathing strand is wound in a helix of steep pitch, as shown externally in FIG. 6, and each strand is formed of a large number of spirally wound wires of small diameter for increased flexibility.

A thick sheath 14 of gas sealing, moisture sealing, flexible, resilient, electrically nonconductive material, such as natural or synthetic rubber, plastic material, or other suitable material surrounds the conductive sheath 12, preferably being molded in place over an inner layer 15 of paper or sheet plastic that is wrapped on the liner 10, to form a gas and water-tight cover. There is thus a gas and moisture tight passage through the cable.

Sheath 14 extends throughout the portion 2 of the cable into connecter portions 3 and 3'. An end 16 of sheath 12 conductive material projects from each end of sheath 14 of covering material; and an end 17 of liner 10 projects from each end of the sheath 12.

In each connecter portion 3 and 3' of this embodiment, an adapter member 18 surrounds the projecting portion 17 of the liner 10 and has a rear tapered portion 19 that fits under the projecting portion 16 of the conductive sheath 14. Member 18 has central bore 20 fits closely over portion 17 of liner 10 and has at least a portion thereof formed with helical ridges 21 that engage the helical valleys between the wire turns of liner 10. Adjacent tapered portion 19 is an externally threaded portion 22 terminating in a shoulder 23 formed by generally cylindrical portion 24 of larger diameter. A nut member 25 threaded on portion 22 secures member 18 in place by clamping both the nonconductive sheath 14 and the conductive sheath 12 to force projecting portion 16 of conductive sheath 12 against the exterior of tapered portion 22 of member 18 and to force the end portion of nonconductive sheath 14 against the expanded end portion 16 of sheath 12. The inner surface of member 25 has an inwardly projecting ridge 26 that engages the exterior of sheath 14 to aid in this.

The end of adapter member 18 has a closed end recess 27 of circular cross section; preferably this recess has major inner cylindrical portion 28 terminating at the bottom of the recess in a radially extending circular groove 29, and a minor outer cylindrical portion 30 of larger diameter, these portions being separated by a radial inwardly open groove 31 of a diameter larger than either portion 28 or 30.

Each connecter portion 3 or 3' is covered with sheathlike handle portion 33 that is slipped and secured over members 18 and 25 and the adjacent end portion of the nonconductive sheath 14.

The parts described so far and shown primarily in FIG. 6, are assembled as follows. Assuming that there is first a subassembly comprising liner 10, conductive sheath 12 and nonconductive sheath 14, all terminating approximately in the same plane at an end of the cable, the nonconductive sheath is first cut back to expose a predetermined portion of the conductive sheath. The conductive sheath is then cut back to expose a predetermined portion 17 of liner 10 that projects beyond the conductive sheath. The nut member 25 is then slipped over the nonconductive sheath at such end of the cable. The tapered portion of adapter member 18 is then engaged with the projecting end 17 of the liner. Member 18 is then rotated to move it axially inwardly along the liner until its tapered inner end portion is forced in between the liner 10 and the sheath 12, this being facilitated by engagement of internal helical ridges 21 of the liner with the valleys between the turns of wire forming the liner. Such movement of member 18 is continued until the end of conductive sheath 14 rides up a predetermined distance on the tapered portion 19 of member 18 and is further continued until a predetermined tension force is imposed on liner 10 by the action of member 18 pulling on liner 10 and pushing on the sheath 12. Nut member 25 is then moved axially and rotated until its internal threads engage the external threads of portion 22 of member 17 and until it firmly clamps sheath 12 and sheath 14 between member 25 and member 18.

This clamping action maintains good electrical contact between conductive sheath 14 and adapter member 18 and also makes a gastight joint between the end portion of sheath 14 and the internal wall of nut member 25 that prevents escape of gas from the interior of liner 10 past the end portion of sheath 14. The tension that is applied to the liner, surprisingly, causes the liner and hence the cable of which the liner forms a part to become considerably limper and more capable of bending, which is an extremely advantageous feature in use. The handle portion 33 may then be put in place. The cable thus far described is shown to advantage in FIG. 6. and The gun 4 shown in FIGS. 1, 2, 7 and 9, is a preferred type of gun embodying the invention that may be employed in connection with the above-described cable. The gun makes electrically conductive and gas tight engagement with a connecter portion 3 or 3' of the cable, and feeds electrode wire, electrical current, and shielding gas to the welding zone. This gun comprises a suitably curved body portion 34 such as a circular cross section metal tube, preferably of copper, having a thick, stiff wall. The end of this tube nearest the cable is internally threaded.

Figure 8:
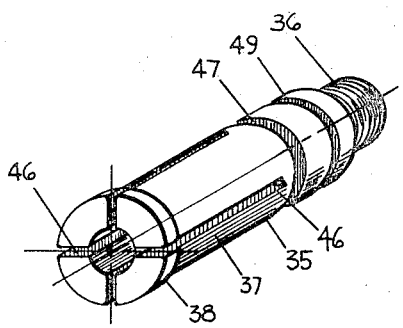
FIG. 8 is an isometric view of an insert member that is fixed to the connected end of the gun.
Figure 7:
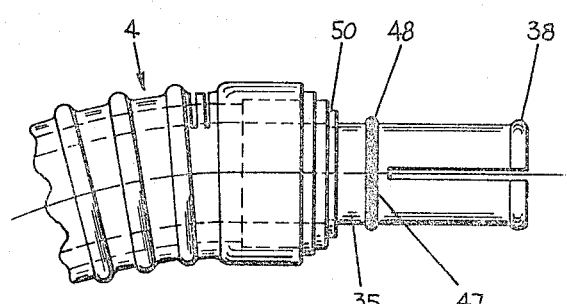
FIG. 7 is an exterior view of the portion of the welding gun shown in FIG. 2 that would be connected to the connecter portion of the cable, but in this case showing the gun as unconnected.

An insert member 35 is screwed into these threads by an externally threaded end portion 36 that forms a gastight electrically conductive joint with the tube. Member 35 also has a generally cylindrical end portion 37 with an end ridge 38, which portion is adapted to fit closely but rotatably in recess 27 of member 18. As shown in FIGS. 2, 7 and 8, member 35 has a central through passage 40 comprising a passage portion 41 extending inwardly from its end portion 36, a somewhat smaller passage portion 42 extending inwardly from portion 41, a passage portion 43 extending inwardly from the free end of end portion 37, and an intermediate portion 44 connecting portions 42 and 43 and of smaller diameter but large enough to permit passage of the electrode wire E while providing good electrical contact with such wire. Passage portion 42 is tapered at 45 from the larger diameter of passage 43 to the smaller diameter of passage 44 to facilitate entry and a close fit by the free end of liner 10 when the gun is connected, such free end being tapered for the purpose; and to facilitate passage of the free end of the electrode wire E from the interior liner 10 into the passage 44 on threading of wire E from the cable into the gun.

Cylindrical portion 37 of insert member 35 has several radial slots 46, four being shown, between the passage 40 and the exterior of portion 37, these slots extending from the free end of portion 37 to a location spaced inwardly from the groove 31 in recess 27 after the gun is connected, and communicating with passage 41. Therefore, gas can flow from the exterior of the liner 10 through slots 46 to passage 41 and thence to the interior of the body tube 34 of the gun.

The generally cylindrical portion 37 of member 35 has a radial outwardly open groove 47 that is located directly opposite the groove 31 when member 35 is properly located in the member 18. A snap ring 48, preferably an O-ring of suitable resilient, flexible material, is normally mounted in the groove 47 as shown in FIGS. 2 and 7. When the portion 37 of the member 35 is pushed into the recess 27 of the member 18 on the cable, the ring 48 snaps into groove 31 and acts to aid in locating the gun axially of the member 18 and to seal the gas, while permitting rotation of the gun relative to the member 18 and the cable 1. The larger diametered portion 30 of the recess 27 facilitates connecting and disconnecting of the gun and snapping of the ring 48 into and out of position in the groove 31. The slots 46 and associated portions of the passage 40 also permit the portions of insert member 35 between such slots to act as spring fingers that spring inwardly when the insert member 35 is pushed into the recess 27 and that spring outwardly to permit ridge portions 38 to fit into the groove 29 further to aid in rotatably locking the member 35 in place in the member 18; similarly, these finger portions are sprung inwardly on withdrawal of member 35 from recess 27.

Another external groove 49 is formed in cylindrical portion 37 of the member 35 to hold a snap ring 50, preferably metal, that is located against the end of the member 18 when the gun is connected. This ring limits inward movement of the member 35 into the recess 27 and also performs other functions to be described later.

The gun 4 also includes annular members 52 and 53 that are mounted near the ends of body 34. Each of is members is formed of suitable electrical insulating and heat-resistant material having substantial structural strength, such as Bakelite. Member 52 is locked against movement toward the adjacent end of member 4 by snap ring 50; member 53 is locked against movement toward the other end of body 34 by another snap ring 54 in groove 55 on body 34. An outer tubular covering and handle member 56, formed of metal or other suitable material having sufficient strength and curved to conform to body 34, is supported in spaced relation to body 34 by members 52 and 53, being locked in place by shoulders 57 and 58 and rings 50 and 54. Member 56 has means providing extended heat transfer surfaces, such as circumferential protuberances 59 that promote transfer of heat from the member 56 to permit it to remain comfortably cool. Other heat transfer means may be provided; thus the member 56 may be longitudinally or radially corrugated of finned for the purpose, either internally or externally or both.

Member 56 also has longitudinally spaced openings 60 near its ends to permit passage of air longitudinally through member 56 by convection to aid in cooling.

At its unconnected end body 34 has a reduced diameter portion 62 having an external thread, and an internal bore 63 larger in diameter than the opening through body 34. Radial openings 64 extend from the longitudinal opening through the body 34 above the bottom of the bore 63.

A metal welding tip 65 formed of heat resistant metal and having axial passage 66 for the welding wire is mounted by one end in bore 63 and is clamped in place by a sleeve 67 and a clamping nut 68 threaded onto external threaded portion 62. The connected end of the welding tip has a frustoconical recess 69 that receives the end of an electrode wire-conducting tube 71 the other end of which extends into member 35 in spaced relation through passage portion 41 and in close relation in smaller passage portion 42 to the end of such passage in alinement with intermediate passage portion 44. This tube 71 can be formed of any suitable material, but preferably is formed of a wear and relatively heat resistant synthetic resin material such as nylon or polysulfone. This tube conducts the electrode wire during initial threading up operation, and later, from passage portion 44 to the passage 66 of the welding tip.

Shielding means for the welding tip includes a metal sleeve member 72 that is fixed to insulating member 53 by being molded or otherwise being fastened in place by suitable known means. This sleeve member has a portion that projects beyond the insulating member 53 and has external threads. Another sleeve member 73, formed of electrical insulating material of substantial structural strength and heat resistant properties, at one end bears against the snap ring 54 and at its other end bears against a shoulder 74 formed in an external sleeve 75 that has an external lip 76 that engages a clamping nut 77 threaded onto the external threads of sleeve 72. Sleeves 72 and 75 are formed of heat-resistant material such as stainless steel. The metal parts of the shielding means, such as external shielding sleeve 75, are thus firmly supported from the insulating member 53 without electrical contact with metal body 34 or any other part including electrical current. The welding tip 65 can be readily removed by removing clamping nut 77 to permit removal of sleeves 75 and 73, and by removing clamping nut 68 that holds the welding tip in place. A replacement welding tip can be readily installed by a simple reverse procedure.

Desired gas flow outside of the welding tip to the welding zone at the free end of the welding tip occurs by passage of gas from passage portion 41, through the hollow interior of body 34, out through radial passages 64, and inside of sleeves 73 and 75 to the desired location.

The feeder 5 attached to cable 1, shown in detail in FIGS. 10 and 11, comprises a body 81 that has fixed to it a supporting bracket 82. Body 81 includes a generally cylindrical portion 83 having at its end a radial ridge 84 and radial slots 85 that extend inwardly from the free end of portion 83 and inwardly from the circular surface to a central passage 86. Central passage 86 at the outer end of portion 83 is enlarged at 87 to receive a felt washer 88 that is suitably slotted centrally at 89 to engage the projecting end of liner 10 at cable 1 and to wipe the passing electrode wire to clean it.

A conduit 91 communicates with passage 86 and supplies gas that passes radially through slots 85 and thence to the interior of liner 10. Passage 86 also is constricted at 92 to aid in supporting a tube 93 or nylon or the like that carries the electrode wire; this tube is locked in place by set screws 94. Body 81 also has an external groove 95 carrying an O-ring 96 that snaps into slot 31 of the adapter member 18 of the cable as shown in FIG. 11 to aid in holding the feeder in the proper position in the recess 27 of member 18. The feeder is also held in place by engagement of groove 29 by the ridged portions 84 on the ends of the fingerlike portions of the feeder between the slots 85, and by bearing of bracket portion 82 against the end of cable member 18. The feeder thus makes excellent electrical contact with the member 18 when it is clamped in electrical contact with the conductor sheath 12.

The feeder is adapted to have threaded into its opposite end a member 97, which forms part of a known apparatus for guiding and driving the electrode wire E through the cable and gun.

Among the advantages of the apparatus so far described are the following. Complete relative rotational movement is permitted between the cable and the welding gun 4 and between the cable and the feeder 5, while both the feeder and the gun are firmly held and prevented from movement longitudinally relative to the cable. Despite such permitted relative rotational movements, there are gastight joints and excellent electrical contacts between the feeder and the conductive sheath through the cable and between the conductive sheath and the conductive portions of the gun to the welding tip of the gun. Each of the welding gun and the feeder can be readily and rapidly disconnected from the cable by a firm pull longitudinally of the end of the cable; similarly each can be reconnected by a firm push longitudinally of the end of the cable. The tension on the liner member of the cable makes the cable limper than would otherwise be the case; this is advantageous in handling the cable during operation. The extended heat transfer surfaces on the outer member of the gun, together with the air cooling through the gun provide a gun handle portion that is considerably cooler to the touch than heretofore possible. In the gun disclosed there cannot be an electrical short between the shielding portions of the nozzle and the welding tip since all exterior portions of the gun are completely electrically insulated from the welding tip and from all other portions of the gun that conduct electricity. Heat from the shield sleeve at the welding end of the gun cannot be conducted back to the rest of the gun as the sleeve is heat insulated from the remainder of the gun. The only consumable portions of the gun are the welding tip 65 and the sleeve member 75, both of which can be replaced with ease and at low cost. Therefore, much less of the gun need be replaced than in conventional guns. The gun can be connected to and disconnected from the cable without reassembling the gun. The connecter portions 3 and 3' of the cable can be readily assembled without the need of welding, brazing or other complicated procedures. If necessary these end portions can be readily removed and reassembled on other cables, or on properly cut ends of the same cable. Other connected means than those disclosed can be used with cables embodying the invention.

Figure 12:
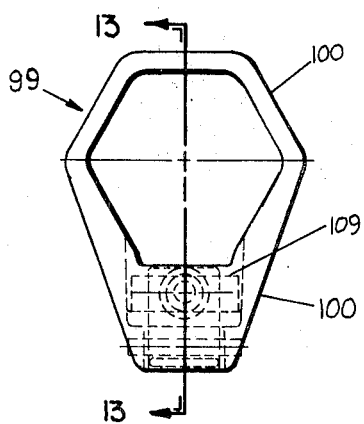
FIG. 12 is a side elevational of an electrical switch that may be used to control the flow of electrical current to and through the welding cable and gun of the preceding FIGS.
Figure 13:
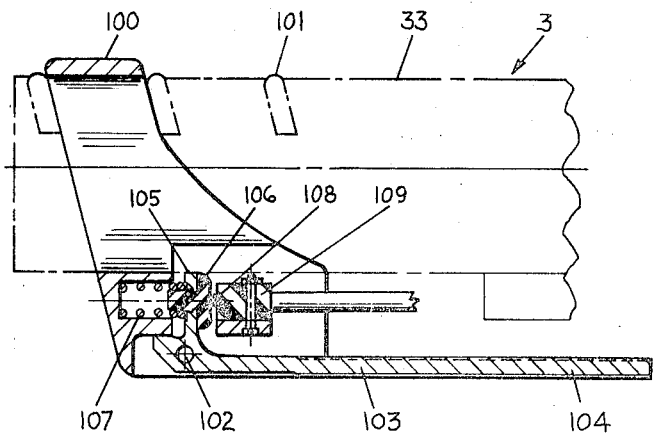
FIG. 13 is a sectional elevation of the switch along line 12–12 of FIG. 12.

FIGS. 12 and 13 illustrate to the same scale as FIGS. 2 and 3 an electrical switch for controlling the flow of electric current to the welding tip. This switch includes a body 100, having a closed cross section as shown in FIG. 12 adapted to be slid over the connecter portion 3 or 3' of a cable and lodged between two of protuberances 101 formed on handle portion 33 for this and for gripping purposes. The body also pivotally supports at 102 a trigger member 103 having a handle 104 adapted to be grasped by the fingers of a hand grasping the connected portion 3 or 3' of a welding cable. The trigger member has perpendicular to handle 104 a lever portion 105 that carries a button 106 of insulating material. This lever portion 105 is biased by a compression spring 107 bearing against the body of the switch to move the handle 104 away from the cable and also to move lever portion 105 so its button engages depressable plunger 108 of a commercially available electrical circuit breaker 109 of the on and off type that is fixed to body 100. This plunger is biased to move outwardly of the body of the circuit breaker 109. When plunger is held inwardly, the circuit is broken; when the plunger extends outwardly the circuit is completed to allow passage of current. Consequently, in the switch assembly illustrated FIGS. 12 and 13 spring 107 normally causes the switch assembly to disconnect the flow of current; while when the handle 104 is manually moved toward the body of the cable, the switch assembly permits current flow.

As illustrated by the schematic illustration circuit in FIG. 1, closing of the switch assembly permits the flow of current to the motor 112 that drives the generator 113 that supplies current to conductors 7 and 8 connected to the feeder and the work.

Figure 17:
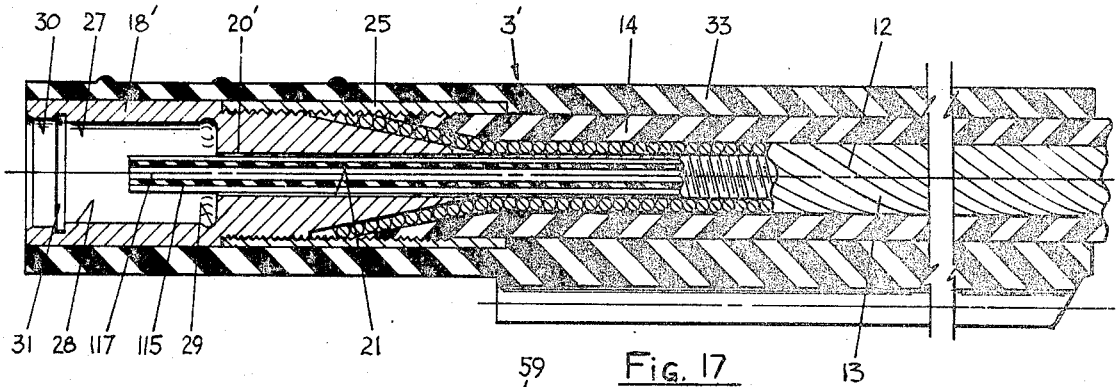
FIG. 17 is a section, similar to FIG. 6, through the connecter portion of a cable embodying the lines of FIGS. 14, 15, and 16a, b, c.
Figure 9:
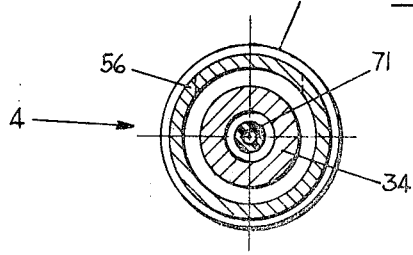
FIG. 9 is a section through the gun along line 9–9 of FIG. 2 and to the same scale.
Figure 16A:
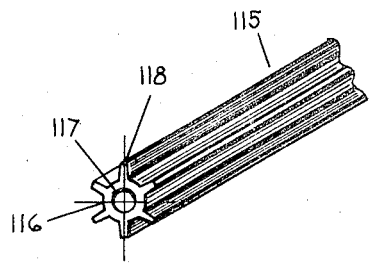
FIGS. 16a, 16b and 16c are respectively isometric, end, and side views of the liner used in the cable 1 of FIG.
Figure 16B:
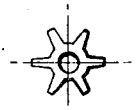
Figure 16C:
Figure 14:
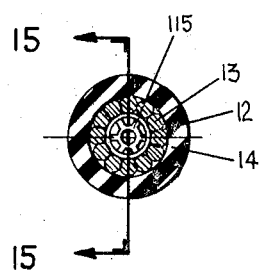
FIG. 14 is a cross section of the cable, generally corresponding to FIG. 3, but showing another embodiment of the cable having a different type of liner means for conducting the welding wire and gas.
Figure 15:
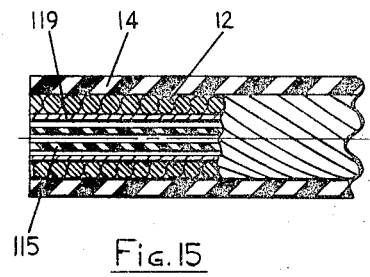
FIG. 15 is a section along line 15–15 of FIG. 14.

The remaining FIGS. disclose a cable embodying a different liner 115, preferably a flexible nonmetallic liner formed of extruded nylon or similar material, that may be used instead of the metal liner 10 of the previous embodiment. In this embodiment, the liner 115 of which a portion of the liner alone is shown in FIGS. 16a, 16b and 16c, has a generally star-shaped cross section and comprises a central body 116 having a longitudinal opening 117 through which welding wire passes and around which are fixed radially projecting longitudinally extending flanges 118. This liner is slid into a flexible metal tubing member 119 that is surrounded by electrically conductive sheath 12 similar to that described in the previous embodiment. Electrode wire travels through the opening 117 while the shielding gas travels through the spaces between the flanges 118 of the liner and the inner surface of tubular member 119. The adapter member 18' (FIG. 17) is similar to member 18 of the previous embodiments, that has a smooth walled central opening 21. The liner 115 may be readily removed by being slid out of the cable from one end, and readily reinserted or replaced by a liner slid into the cable from one end. Removal or replacement might be desirable to install a liner having a different sized central opening for a different sized electrode wire, or for other purposes. Liners of other materials and cross-sectional shapes may be used.

It is apparent that various modifications may be made other than those disclosed in the illustrated embodiment without departing from the spirit of the invention. It is intended that the patent shall cover, by suitable expression in the appended claims, whatever features of patentable novelty reside in the invention.

I claim:
1. A system for transmitting gas and electrical current by a cable and through a gun, comprising a cable having at an end thereof a recessed member of electrically conductive metal, said member having a socket recess having an axis extending generally axially of the cable and open at said end of the cable, and means connected to said recessed member for supplying electrical current to said member and for supplying gas to the interior of said recess, said recess having an interior wall of circular cross section extending for a major portion of the length of said recess and forming part of said recessed member; said gun having a body of electrically conductive metal having at one end a projecting end portion of electrically conductive metal with an exterior surface that fits closely against the interior wall of said socket recess in said recessed member of said cable in metal-to-metal contact to provide good electrical conductivity while being capable of rotational movement relative to said interior wall of said recessed member; and means for restraining said projecting portion against axial movement out of said recess comprising a circumferential inwardly open groove located in said interior wall of said recess axially inward from the open end of said recess and a circumferential externally open groove located in said projecting portion of said gun located opposite said groove in said recess of said recessed member when said projecting portion is in place in said recessed member of said cable, and a sealing ring received in both of said grooves to seal against escape of gas between the projecting portion of said recessed member while permitting relative rotation between said gun and said recessed member.

2. A system for transmitting gas and electrical current by a cable and through a gun, comprising a cable having at an end thereof a recessed member of electrically conductive metal, said member having a socket recess having an axis extending generally axially of the cable and open at said end of the cable, and means connected to said recessed member for supplying electrical current to said recessed member and for supplying gas to the interior of said recess, said recess having an interior wall of circular cross section extending for the major portion of the length of said recess and forming part of said recessed member; said gun having a body of electrically conductive metal having at one end a projecting portion of electrically conductive metal with an exterior surface that fits closely against the interior wall of said socket recess in said recessed member of said cable in metal-to-metal contact to provide good electrical conductivity while being capable of rotational movement relative to said interior wall of said recess member; and means for restraining said projecting portion against axial movement out of said recess and for holding said exterior surface of said projecting portion against the interior wall of said recess in good electrical contact while permitting said relative rotational movement, comprising a circumferential inwardly open groove located in said interior wall of said recess axially inwardly from the open end of said recess; said projecting portion of said gun having a portion that has at least one slot extending inwardly from the free end of said projecting portion and having an unslotted portion located inwardly of said slotted portion, means on said unslotted portion for receiving a sealing ring adapted to fit in said circumferential inwardly open groove of said recessed member, and an opening extending axially through said projecting portion through its slotted portion and its unslotted portion, said opening communicating with said slot in said slotted portion to permit passage of gas between said slot and the portion of the opening in said unslotted portion of said projecting portion.

3. The apparatus of claim 1 in which said cable has at each of its two ends one of said recessed members, and said two recessed members are essentially identical.

4. The apparatus of claim 3 comprising feeder means for feeding gas and electrical current to said cable, which feeder means is connected to said recessed member at the end of the cable opposite the end at which is located the recessed member to which said gun is connected.

5. The apparatus of claim 2 in which said cable has at each of its two ends one of said recessed members, and said two recessed members are essentially identical.

6. The apparatus of claim 5 comprising feeder means for feeding gas and electrical current to said cable, which feeder means is connected to said recessed member at the end of the cable opposite the end at which is located the recessed member to which said gun is connected.

PO-1050
(5/69)

UNITED STATES PATENT OFFICE
CERTIFICATE OF CORRECTION

Patent No. 3,544,758             Dated December 1, 1970

Inventor(s) Guido A. dal Molin

It is certified that error appears in the above-identified patent and that said Letters Patent are hereby corrected as shown below:

In the heading, the name of the Assignee reads "UNITEC"; should read

--UNITEC CORPORATION--

Signed and sealed this 23rd day of March 1971.

(SEAL)
Attest:

EDWARD M. FLETCHER, JR.           WILLIAM E. SCHUYLER, JR.
Attesting Officer                 Commissioner of Patents